United States Patent
Ko

[19]

[11] Patent Number: 6,007,308
[45] Date of Patent: Dec. 28, 1999

[54] COUPLING DEVICE FOR A PUMP IMPELLER

[75] Inventor: Fretrick Siu Kwan Ko, Hong Kong, China

[73] Assignee: Johnson Electric S.A., La Chaux-de-Fonds, Switzerland

[21] Appl. No.: 09/109,081

[22] Filed: Jul. 2, 1998

[30] Foreign Application Priority Data

Jul. 2, 1997 [GB] United Kingdom .................... 9713892

[51] Int. Cl.⁶ ........................................................ F04B 9/00
[52] U.S. Cl. ........................................ 417/319; 417/423.6
[58] Field of Search .............................. 417/423.1, 423.6, 417/319; 416/66, 64; 74/827, 840

[56] References Cited

U.S. PATENT DOCUMENTS

| 4,247,265 | 1/1981 | Cavalcante . |
| 5,393,203 | 2/1995 | Hantle ..................................... 417/203 |
| 5,472,321 | 12/1995 | Radermacher ........................... 417/365 |

FOREIGN PATENT DOCUMENTS

| 0207430B1 | 1/1987 | European Pat. Off. . |
| 0287984B1 | 10/1988 | European Pat. Off. . |
| 0474004B1 | 3/1992 | European Pat. Off. . |
| 0481410A2 | 4/1992 | European Pat. Off. . |
| 0505980A1 | 9/1992 | European Pat. Off. . |
| 2024528A | 1/1980 | United Kingdom . |
| 2220528A | 1/1990 | United Kingdom . |
| 94 21026 | 9/1994 | WIPO . |

*Primary Examiner*—Henry Bennett
*Assistant Examiner*—Derek S. Boles
*Attorney, Agent, or Firm*—Birch, Stewart, Kolasch & Birch, LLP

[57] ABSTRACT

A coupling device for coupling a rotor and an impeller of an electric pump has a coupler body 41 fixed to a shaft of the rotor and accommodated within a cavity 31 of the impeller 11. The body 41 comprises a cylindrical portion 43 and a flange 42 located at one end of the cylindrical portion 43. The cavity 31 has an inner section 32 accommodating the cylindrical portion 43 of the body and an outer section 33 of larger diameter accommodating the flange 42. The flange 42 has a groove 46 on a surface facing the impeller 11. The impeller has two grooves 36 on a surface confronting the flange, the grooves 36, 46 co-operating to form two arcuate tunnels of circular cross-section. Inside each tunnel is located a spherical ball 50. Rotation of the impeller with respect to the body causes the balls to move along the grooves until at least one tunnel is reduced in length to the diameter of the ball whereby further relative rotation in the same direction between the impeller and coupler body is prevented. A retaining plate 37 retains the coupler body 41 within the cavity 31 of the impeller and a spring washer 38 maintains frictional contact on the balls by the impeller and the coupler body.

12 Claims, 5 Drawing Sheets

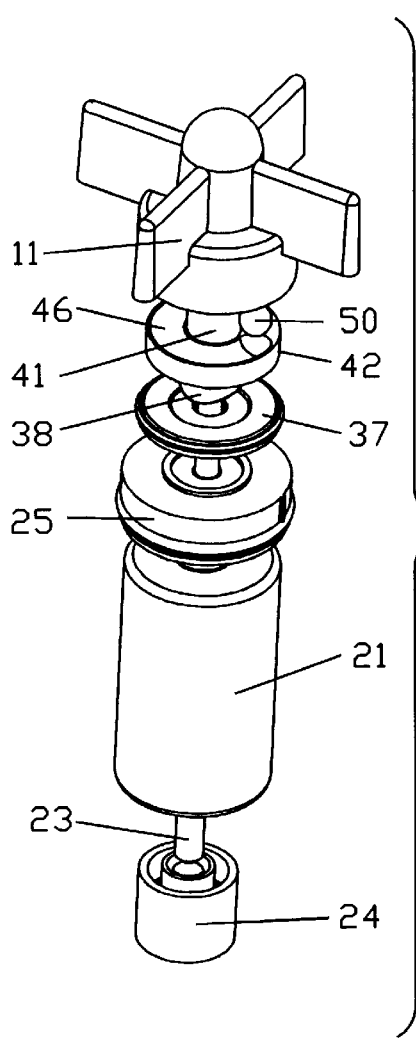
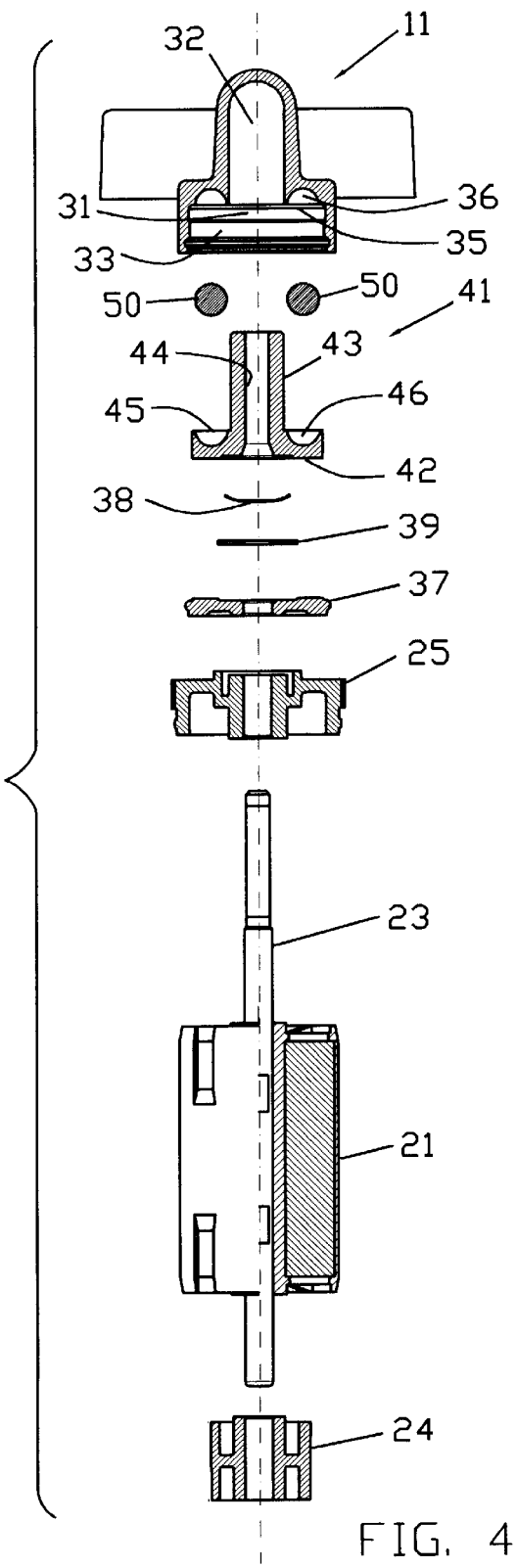
FIG. 3
FIG. 4

COUPLING DEVICE FOR A PUMP IMPELLER

FIELD OF THE INVENTION

This invention relates to an electric pump and in particular, to a coupling device for connecting an impeller of the pump to a rotor of a motor driving the pump.

DESCRIPTION OF THE PRIOR ART

Small electric pumps, for example as used for circulating water in fish tanks and for draining water from washing machines, are well known. Such pumps are usually driven by subfractional horsepower single phase synchronous motors which have a long life and a simple construction allowing the stator to be fully sealed from the pump chamber and from the rotor of the motor. The rotor may or may not be sealed from the pump chamber. See, for example, GB 2024528 A by Askoll SRL.

Being a single phase synchronous motor, the motor can start in either direction and thus, the impeller of the pump is designed to operate in both directions. However, the starting torque is relatively low and the motor has difficulty starting under a full load.

To overcome this problem, it is known to allow a limited range of free rotation between the rotor and impeller, usually up to about 360°. This allows the motor to gain initial momentum before driving the impeller and its load. As shown in the above mentioned GB 2024528 A, this is achieved by the interaction of two spigots. However, as the coupling allows free movement of slightly less than 360° there is considerable noise and strain as the spigots crash together.

EP 0287984 A1, also by Askoll Spa, sought to overcome this problem by having the spigots rotate within a sealed chamber containing a viscous fluid, e.g., an oil or grease, to absorb the knocking noise. While this design was relatively quiet, it introduced a possible source of contamination should the seal of the chamber fail during use, allowing the viscous fluid to mix with the fluid being pumped.

Thus there is a need for a rotor to impeller coupling device for an electric pump which allows a predetermined angle of relative rotation between the rotor and the impeller without the need for a sealed chamber.

SUMMARY OF THE INVENTION

Accordingly, the present invention provides a coupling device for coupling a rotor and an impeller, comprising:

a coupler body fixed to a shaft of the rotor, the body having a substantially planar surface which extends in a plane orthogonal to the axis of the shaft, said surface forming a first contact face;

an impeller having a substantially planar surface extending in a plane orthogonal to the axis of the shaft, said surface forming a second contact face;

the impeller being rotatably mounted to the shaft with the second contact face confronting the first contact face;

the first and second contacting faces each having a groove, each groove being arcuate with a constant radius from the shaft;

a coupling element disposed in the groove of the first contact face and in the groove of the second contact face; and retaining means for retaining the first and second contacting faces close together, whereby relative rotation about the shaft by the impeller is limited to a predetermined angle by the coupling element engaging opposite ends of the grooves in which it is disposed.

Preferably, there are two or more coupling elements and one or each contacting face has a corresponding number of grooves.

Preferably, the coupling element is a spherical ball, ideally of stainless steel, rubber coated steel or plastics material.

Preferably, the body has a flange portion on which the first contact face is formed and a boss extending axially from the first contact face, and is disposed within a cavity in the impeller, the impeller being journalled on the boss of the body.

Preferably, the retaining means includes a cover fitted to the mouth of the cavity in the impeller to retain the body and a spring disposed between the cover and the body urging the body into the cavity of the impeller, Alternatively, the retaining means includes a stop provided on the shaft adjacent the end of the impeller remote of the rotor and a spring disposed between the stop and the impeller urging the impeller towards the body.

According to other aspects, the invention also provides a rotor and an impeller assembly for an electric pump and an electric pump motor incorporating such a coupling device.

BRIEF DESCRIPTION OF THE FIGURES

A preferred embodiment of the invention will now be described by way of example only, with reference to the accompanying drawings in which:

FIG. 3 is an exploded isometric view of the rotor and impeller of the pump motor of FIG. 1;

FIG. 4 is an exploded sectional view of the rotor/impeller of FIG. 3;

DETAILED DESCRIPTION OF THE PREFERRED EMBODIMENT

Figure 1:
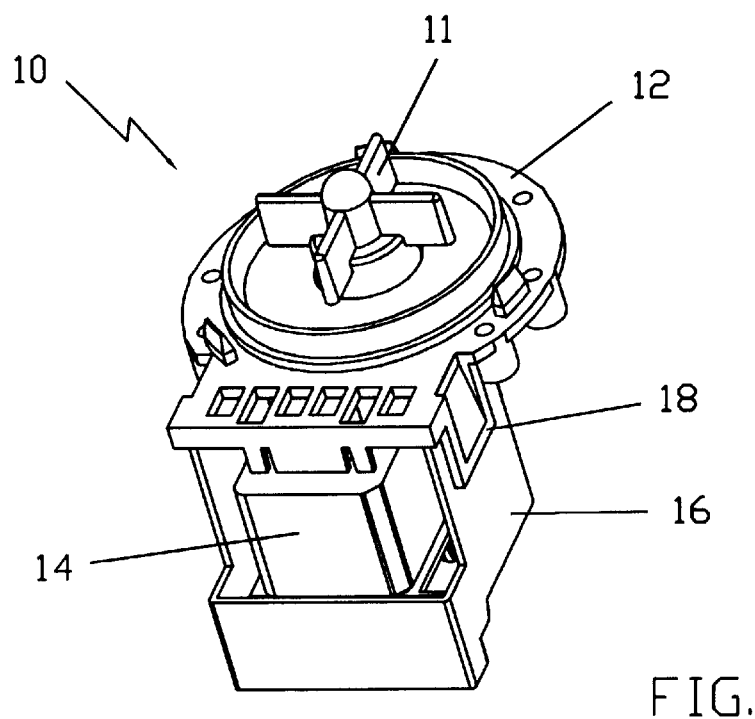
FIG. 1 is an isometric view of a pump motor according to the preferred embodiment of the present invention.

FIG. 1 is an isometric view of an electric pump motor 10 to which the present invention is applicable. The motor 10 is shown with the pump impeller I 1 attached but without the pump housing which, with the motor flange 12, forms the pumping chamber. The motor has a stator in the form of a bobbin wound stator coil (not shown) fitted to a 'C' shaped laminated stator core 14. A cover 16 protects the stator winding and is held to the motor flange 12 by snap retainers 18.

Figure 2:
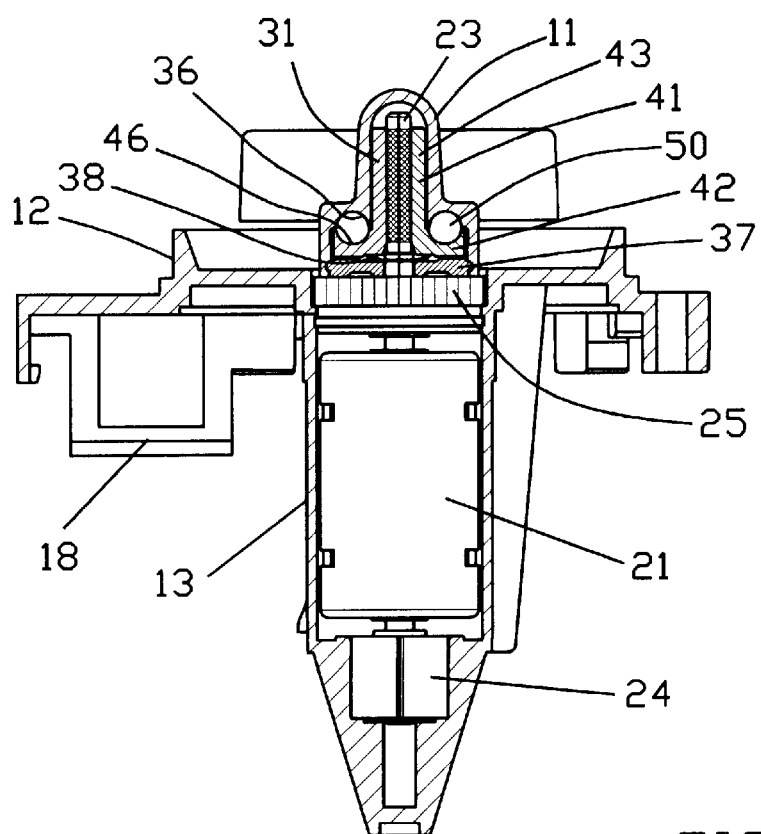
FIG. 2 is a sectional view of the pump motor of FIG. 1.

FIG. 2 is a cross-sectional elevation of the rotor assembly 20 and motor flange 12. The rotor assembly 20 which is shown more clearly in exploded form in FIGS. 3 & 4, comprises a two pole permanent magnet rotor 21, the coupler body 41 and bearings 24, 25, fitted to a shaft 23 and the impeller 11. The motor flange 12 is integrally formed with a tube having a closed end forming a rotor housing 13. Lower bearing 24 is fitted in the closed end of the tube while the upper bearing 25 closes the open end of the tube. The open end may or may not be sealed by the upper bearing. This depends on the motor and pump design as in some applications it is not necessary to seal the rotor housing from the pump chamber. Indeed, in some applications it is desirable for the fluid being pumped to circulate within the rotor housing. The poles of the stator core 14 are disposed on opposite sides of the rotor housing 13 to magnetically confront the magnets of the rotor. The impeller 11 is coupled to the shaft 23 within the pump chamber by a coupling device which allows the impeller to rotate with respect to the rotor within a limited and predetermined angle.

The impeller 11 has an open cavity 31. The cavity has a cylindrical inner section 32 and a larger diameter outer section 33 and is sized to suit the coupler body 41. The coupler body has a flange 42 and an axially extending cylindrical portion or boss 43. The coupler body is a sliding fit within the cavity 31 with the flange 42 being accommodated within the outer section 33 and with the boss 43 being accommodated by the inner section 32. The body 41 has a central through hole 44 for mounting the body to the shaft 23, preferably as a press fit on the shaft. Knurling may be added to the shaft to improve the grip between the shaft 23 and the body 41.

A cap 37, which is a snap fit with the mouth of the cavity, is used to retain the coupler body within the cavity. A spring 38 in the form of a curved or wavy washer is used to urge the body 41 axially towards the impeller 11. A flat washer 39 provides a rubbing surface between the spring 38 and the cap 37.

Figure 5:
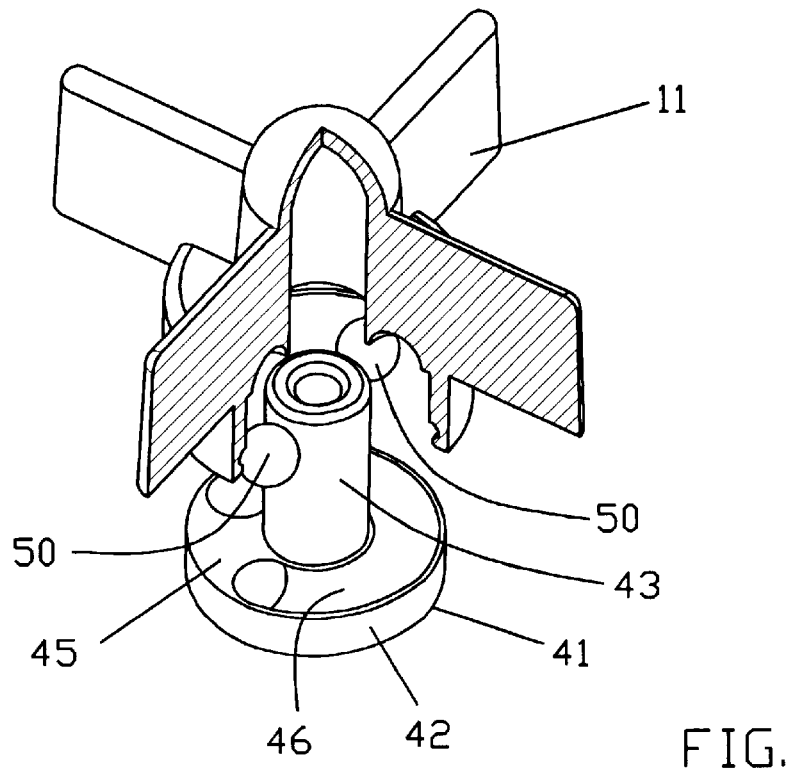
FIG. 5 is an isometric view of the impeller and coupling device of the rotor of FIG. 3.
Figure 6:
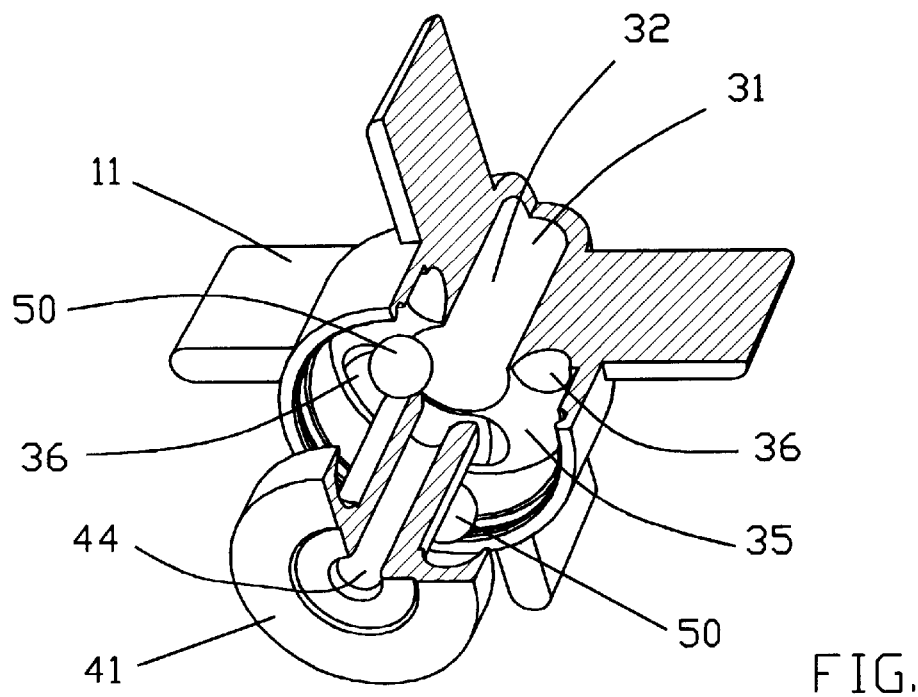
FIG. 6 is an isometric view from below of the impeller and coupling device of FIG. 5, partially sectioned.
Figure 7:
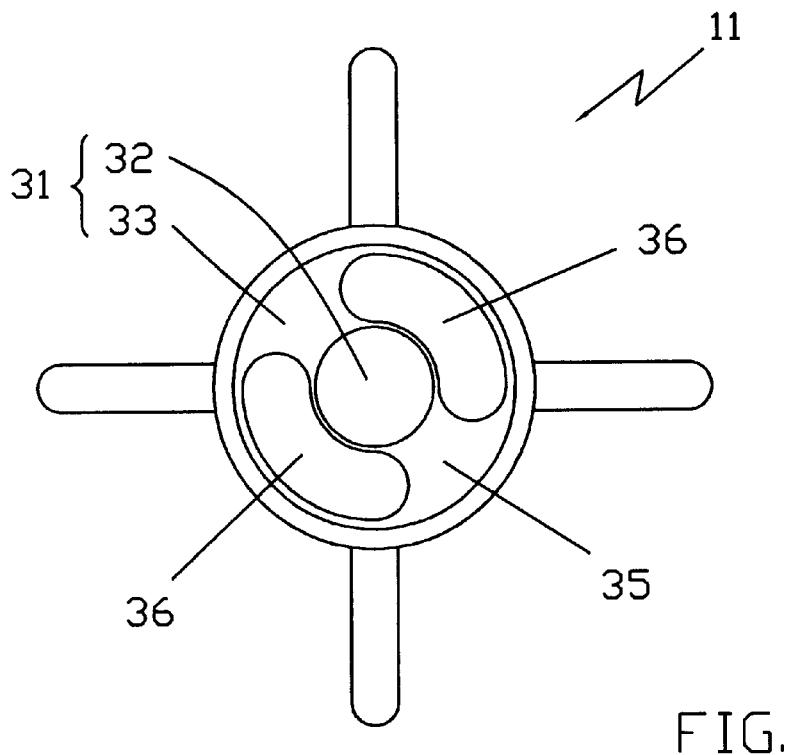
FIG. 7 is an underneath plan view of the impeller of FIG. 5.

As shown in FIG. 5, the flange 42 has a face facing the cavity 31 of the impeller 11 which forms a first contact face 45. As shown in FIGS. 4, 6 & 7, the cavity 31 in the impeller 11 has a shoulder between the inner and outer sections. This shoulder forms a second contact face 35. The two contact faces confront one another. The first contact face 45 has a single arcuate groove 46 having a constant radius centred on the shaft axis. The groove extends for approximately 270°. As shown in FIG. 7, the second contact face 35 has two arcuate grooves 36 having the same constant radius from the shaft axis as groove 46 in the first contact face. These two grooves 36 each extend for approximately 90°. When the two contact faces are aligned the respective grooves 36, 46 are also aligned and form closed holes or tunnels.

Two coupling elements 50 in the form of spherical balls are disposed partially in groove 46 and partially in respective grooves 36. The diameter of the elements 50 is approximately equal to the combined depth of respective grooves 36, 46. If the diameter of the elements is slightly larger than the combined depth of the grooves the elements 50 prevent the two contact faces from coming into direct contact. If not the contact faces do not bear directly onto the elements allowing them to slide or roll more freely within the grooves.

Figure 8:
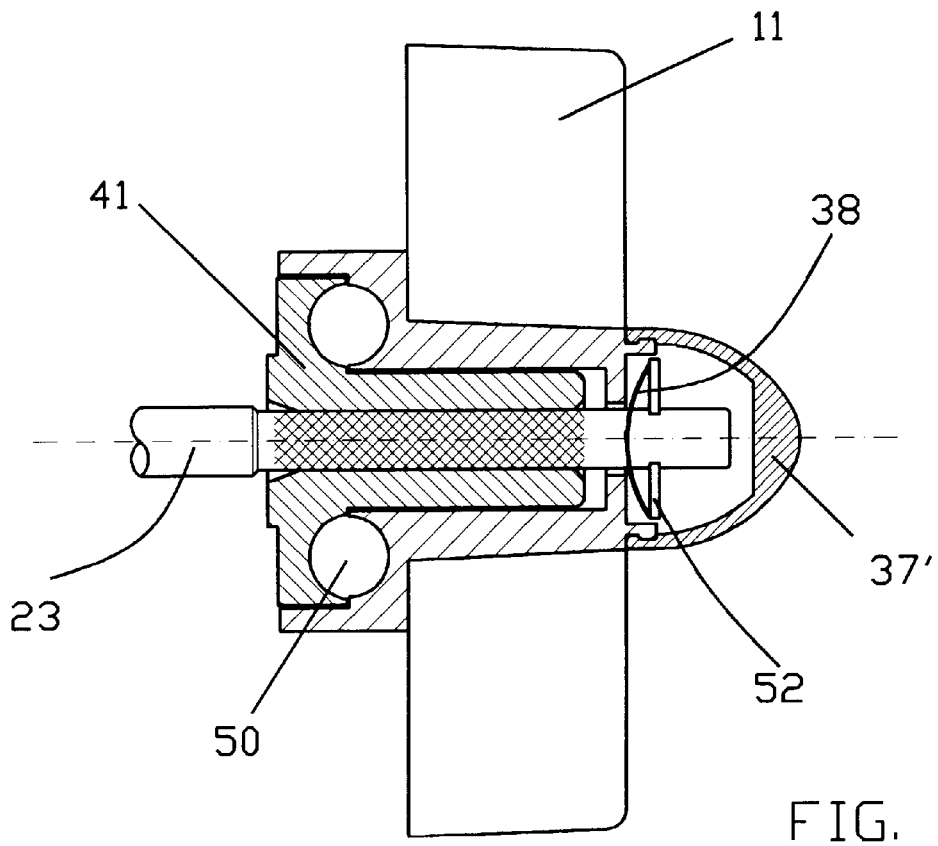
FIG. 8 is a sectional view of an impeller and coupling device of an alternative embodiment.

FIG. 8 illustrates an alternative embodiment in which the means for maintaining the impeller in close proximity axially to the coupler body comprises a retaining ring 52 (e.g. an E-ring) fitted to the shaft and a spring 38 in the form of a curved or wavy washer bearing against the retaining ring and the impeller to directly urge the impeller towards the coupler body. A cap 37' snaps to the end of the central portion of the impeller to cover the end of the shaft 23.

Figure 9:
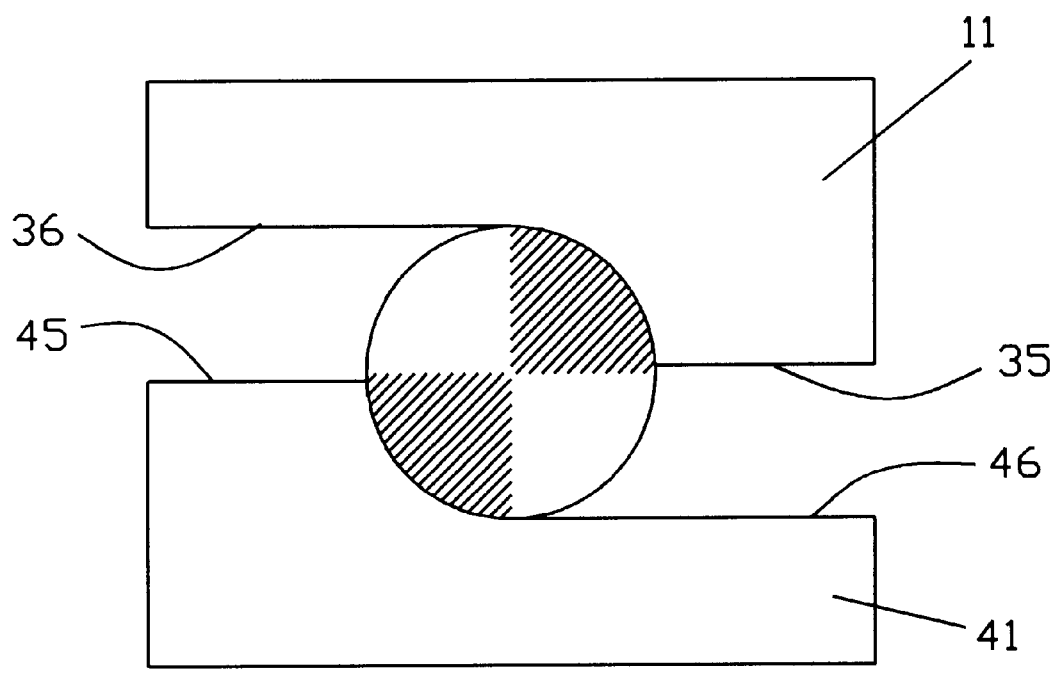
FIG. 9 is a schematic view illustrating the mechanism for transferring power from the coupler to the impeller.

In use, in either embodiment, the spring 38 urges the coupler body 41 into frictional contact with the impeller 11 either directly or by way of the balls 50. As the rotor turns in one direction the impeller is able to remain stationary until a ball 50 is sandwiched or nipped between opposite ends of the grooves 36, 46 in which it is disposed. At this time the impeller becomes forced to rotate with the rotor. When the rotor rotates in the opposite direction, the balls roll or slide along the grooves until the other ball is nipped between the other end of groove 46 and one end of the other groove 36, causing the impeller to rotate with the rotor 12. FIG. 9 schematically illustrates a ball 50 being nipped between one end of the groove 46 and one end of one of the grooves 36. Because of the retaining means, the impeller 11 and the coupler body 41 can not separate axially enough for the balls to be dislodged from the grooves and the impeller is driven by the coupler body through the balls.

Although the preferred invention has been described as comprising a single groove in the coupler and two grooves in the impeller, the configuration can be reversed. Indeed either part may have one or more grooves and the number of balls may be varied to suit the application. The embodiment described, using two balls, is considered the most practical for a small pump application. Use of a single ball and a single 270° groove on each contact face would give almost 540° angle of relative rotation. The angle of relative rotation can be predetermined by selecting the number of and length of the grooves and the number of balls.

I claim:

1. A coupling device for coupling a rotor and an impeller, the device comprising:

a coupler body fixed to a shaft of the rotor, the body having a substantially planar surface which extends in a plane orthogonal to the axis of the shaft, said surface forming a first contact face;

an impeller having a substantially planar surface extending in a plane orthogonal to the axis of the shaft, said surface forming a second contact face;

the impeller being rotatably mounted to the shaft with the second contact face confronting the first contact face;

the first and second contacting faces each having a groove, each groove being arcuate with a constant radius from the shaft;

a coupling element disposed in the groove of the first contact face and in the groove of the second contact face; and retaining means for retaining the first and second contacting faces close together, whereby relative rotation about the shaft by the impeller is limited to a predetermined angle by the coupling element engaging opposite ends of the grooves in which it is disposed.

2. The coupling device of claim 1, wherein there are two or more coupling elements and one contacting face has a corresponding number of grooves.

3. The coupling device of claim 1, wherein there are two or more coupling elements and both contacting faces have a corresponding number of grooves.

4. The coupling device of claim 1, wherein the coupling element is a spherical ball.

5. The coupling device of claim 4, wherein the spherical ball is of stainless steel.

6. The coupling device of claim 4, wherein the spherical ball is plastics material.

7. The coupling device of claim 4, wherein the spherical ball is rubber coated steel.

8. The coupling device of claim 1, wherein the impeller is journalled on the body.

9. The coupling device of claim 8, wherein the body has a flange portion on which the first contact face is formed and a boss extending axially from the first contact face, and is disposed within a cavity in the impeller, the impeller being journalled on the boss of the body.

10. The coupling device of claim 1, wherein the retaining means includes a cover fitted to the mouth of the cavity in the impeller to retain the body and a spring disposed between the cover and the body urging the body into the cavity of the impeller.

11. The coupling device of claim 1, wherein the retaining means includes a stop provided on the shaft adjacent the end of the impeller remote of the rotor and a spring disposed between the stop and the impeller urging the impeller towards the body.

12. A rotor and impeller assembly for an electric pump incorporating the coupling device of claim 1.

* * * * *